United States Patent [19]

Goto

[11] Patent Number: 5,156,916
[45] Date of Patent: Oct. 20, 1992

[54] MAGNETIC RECORDING MEDIUM COMPRISING A POLYURETHANE BINDER HAVING A POLAR GROUP AND CONTAINING IRON CARBIDE

[75] Inventor: Narito Goto, Hino, Japan

[73] Assignee: Konica Corporation, Tokyo, Japan

[21] Appl. No.: 693,774

[22] Filed: Apr. 26, 1991

Related U.S. Application Data

[63] Continuation of Ser. No. 320,719, Mar. 8, 1989, abandoned.

[30] Foreign Application Priority Data

Mar. 14, 1988 [JP] Japan ............................ 63-59669

[51] Int. Cl.$^5$ ................................................ G11B 5/00
[52] U.S. Cl. ................................ 428/425.9; 428/424.6; 428/694; 428/900
[58] Field of Search .................. 428/900, 694, 425.9, 428/424.6

[56] References Cited

U.S. PATENT DOCUMENTS

| | | | |
|---|---|---|---|
| 4,600,521 | 7/1986 | Nakamura et al. | 252/62.54 |
| 4,613,545 | 9/1986 | Chubachi et al. | 428/328 |
| 4,632,866 | 12/1986 | Kubota et al. | 428/328 |
| 4,637,959 | 1/1987 | Ninomiya et al. | 428/425.9 |
| 4,707,411 | 11/1987 | Nakayama et al. | 428/413 |
| 4,784,914 | 11/1988 | Matsufuji et al. | 428/418 |
| 4,789,599 | 12/1988 | Nakamura et al. | 428/411.1 |
| 4,794,042 | 12/1988 | Kubota et al. | 428/328 |

FOREIGN PATENT DOCUMENTS 123318 10/1984 European Pat. Off. .

OTHER PUBLICATIONS

Patent Abstracts of Japan, vol. 11, No. 378 (P-645) [2825]; Dec. 10, 1987 JPA-62-146,432; Jun. 30, 1987.

Primary Examiner—Paul J. Thibodeau
Assistant Examiner—Stevan A. Resan
Attorney, Agent, or Firm—Jordan B. Bierman

[57] ABSTRACT

A magnetic recording medium having a support and provided thereon, a magnetic layer containing a magnetic powder including iron carbide, and a binder comprising a polar group is disclosed. The binder comprises a resin (A) and a copolymer resin formed by copolymerization of a monomer (A) and a copolymeric monomer comprising the polar group, wherein the polar group is selected from a sulfo group, a phospho group, a carboxyl group or derivatives thereof including salts thereof; the resin (A) is preferably a urethane resin having the polar group; the monomer (A) is preferably vinyl chloride.

14 Claims, 1 Drawing Sheet

MAGNETIC RECORDING MEDIUM COMPRISING A POLYURETHANE BINDER HAVING A POLAR GROUP AND CONTAINING IRON CARBIDE

This application is a continuation of Ser. No. 07/320719, filed Mar. 8, 1989, now abandoned.

FIELD OF THE INVENTION

The present invention relates to a magnetic recording medium such as a magnetic tape, a magnetic sheet and a magnetic disk.

BACKGROUND OF THE INVENTION

Generally, a magnetic recording medium such as a magnetic tape and the like is produced by coating on a support a magnetic composition composed essentially of a magnetic powder, a resin binder and others, followed by drying. In such a magnetic recording medium, especially in a video tape, $\gamma$-$Fe_2O_3$, Co-$\gamma$-$Fe_2O_3$ and the like have been conventionally used as a magnetic powder, and it is a recent practice to use magnetic powders with smaller particle size in order to achieve higher S/N ratios. Further, Ba ferrite and metal powders have been used to meet a requirement for a higher density recording.

On the other hand, as described in Japanese Patent Publication Open to Public Inspection No. 60-124023/1985, a magnetic powder based on iron carbide is proposed. The iron carbide magnetic powder provides a high output at high Hc and an excellent conductivity and light-shielding property. However, a magnetic powder with finer particles (a BET value of over 40 $m^2$/g) for a higher density recording results in poor dispersibility of the particles especially of iron carbide, which in turn results in the inferior electromagnetic conversion characteristics of a magnetic recording medium, and further a durability in repetitive playing also deteriorates due to poor dispersibility.

SUMMARY OF THE INVENTION

The object of this invention is to provide a magnetic recording medium which provides a good conductivity and light-shielding property and the electromagnetic conversion characteristics such as a reproduction output as well as the satisfactory travelling properties such as a travelling durability.

Figure 1:
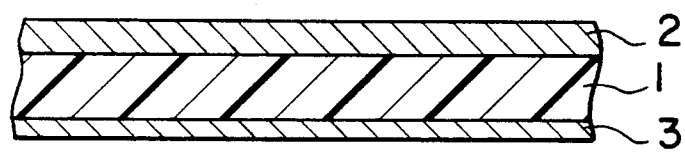
FIGS. 1 and 2 show respectively an enlarged section of a magnetic recording medium.

1 ..... Support
2 ..... Magnetic layer
3 ..... Back coating layer (BC layer)

DETAILED DESCRIPTION OF THE INVENTION

The present invention relates to a magnetic recording medium where a magnetic layer comprises a magnetic powder containing iron carbide and a binder with a polar group which is selected from the group of a sulfo group, a phospho group, a carboxyl group, and the derivatives thereof including the salts.

A magnetic recording medium produced in accordance with the invention, containing an iron carbide in a magnetic powder, provides the characteristics peculiar to iron carbide, that is, a high Hc, $\sigma$ s which is lower than that of a magnetic metal powder but higher than that of a Co-containing iron oxide, and a high reproduction output. Further, a high conductivity and light-shielding effect can be achieved. Iron carbide is chemically stable, and so hard that an addition amount of $\alpha$-$Al_2O_3$ as an abrasive can be reduced. It is less expensive since it can be produced directly from oxy-iron hydroxide etc. at a lower production cost.

This invention enables a magnetic powder containing iron carbide to disperse well by virtue of a binder having a polar group as mentioned above, even when the magnetic powder is divided into fine particles with a BET value of over 40 $m^2$/g. The polar group in the molecule of the binder improves its compatibility with the magnetic powder, which results in improving its dispersibility. As a result, the magnetic recording medium is improved in electromagnetic conversion characteristics such as a rectangular ratio and an output, and in durability in repetitive play. Good dispersibility and less flocculation of a magnetic powder lead to less dropout in a recording medium.

The magnetic powder of the invention may comprise mainly of iron carbide or of the mixture of iron carbide and other magnetic powders. The preferable ratio of iron carbide to the other magnetic powders is 95:5 to 55:45 (by weight).

Iron carbide contained in a magnetic powder of the invention is represented by $Fe_nC$ ($n \geq 2$), wherein the typical example is $Fe_5C_2$, and the others are $Fe_{20}O_9$, $Fe_3C$, $Fe_2C$, and the like. There can be incorporated into the magnetic powder the other elements such as Co, Ni, Al, Zr, Cr and Si, besides iron.

In this invention, iron carbide can be used in combination with magnetic oxide powders such as $\gamma$-$Fe_2O_3$, Co-containing $\gamma$-$Fe_2O_3$, Co-deposited $\gamma$-$Fe_2O_3$, $Fe_3O_4$, Co-containing $Fe_3O_4$, Co-deposited $Fe_3O_4$, and $CrO_2$, and with ferromagnetic metal powders based on Fe, Ni and Co, such as Fe-Al, Fe-Al-Ni, Fe-Al-Co, Fe-Al-Zn, Fe-Ni-Co, Fe-Mn-Zn, Fe-Ni, Fe-Ni-Al, Fe-Ni-Zn, Fe-Co-Ni-Cr, Fe-Co-Ni-P, and Co-Ni. Especially, Fe-based metal powders with Fe of over 80 atm% exhibit excellent electromagnetic properties, and it is advantageous in respect of corrosion resistance and dispersibility to employ metal powders such as Fe-Al, Fe-Al-Ni, Fe-Al-Zn, Fe-Al-Co, Fe-Ni, Fe-Ni-Al, and Fe-Ni-Zn. The magnetic metal powders may contain as additives such elements as Si, Cu, Zn, Al, P, Mn and Cr or their compounds. Hexagonal ferrites such as barium ferrite, and iron nitride are also applicable.

A base polymer used for a binder in the invention comprises an average molecular weight of approximate 10000 to 200000. The examples are urethane resin, copolymer of vinyl chloride and vinyl acetate, copolymer of vinyl chloride and vinylidene chloride, copolymer of vinyl chloride and acrylonitrile, copolymer of butadiene and acrylonitrile, polyamide resin, polyvinylbutyral, cellulose derivatives (cellulose acetate butylate, cellulose diacetate, cellulose triacetate, cellulose propionate, nitrocellulose, etc.), copolymer of styrene and butadiene, polyester resin, synthetic rubbers, phenolic resin, epoxy resin, urea resin, melamine resin, phenoxy resin, silicone resin, reactive acrylicresin, mixture of high molecular weight polyester and isocyanate prepolymer, mixture of polyester polyol and polyisocyanate, urea-formaldehyde resin, mixture of low molecular weight glycol, high molecular weight diol and isocyanate, and mixture of such polymers.

The above-mentioned resins used in the invention preferably contain a hydrophilic polar group represented by —SO₃M, —COOM, or —PO(OM')₂ (M and M' represent each a hydrogen atom and an alkali metal such as lithium, potassium and sodium, or a substituted or unsubstituted hydrocarbon residue).

A vinyl chloride copolymer applicable as a binder in the invention can be obtained by copolymerization of a vinyl chloride monomer with a copolymeric monomer containing an alkali salt of sulfonic acid, caboxylic acid or phosphoric acid and, if necessary, together with another copolymeric monomer. The properties of the foregoing vinyl chloride copolymer can be optimized by selecting copolymeric monomers.

The alkali metal of the preceding sulfonate, phosphate and the like is preferably sodium, potassium or lithium, more preferably potassium in respect of solubility, reactivity, yield and the like.

The examples of the copolymeric monomers containing sulfonates are:

CH₂=CHSO₃M.

CH₂=CHCH₂SO₃M.

CH₂=C(CH₃)CH₂SO₃M.

CH₂=CHCH₂OCOCH(CH₂COOR)SO₃M.

CH₂=CHCH₂OCH₂CH(OH)CH₂SO₃M.

CH₂=C(CH₃)COOC₂H₄SO₃M.

CH₂=CHCOOC₄H₃SO₃M,

CH₂=CHCONHC(CH₃)₂CH₂SO₃M.

The examples of the copolymeric monomers containing carboxylates are:

CH₂=CHCOOM

CH₂=CHCH₂COOM.

CH₂=C(CH₃)CH₂COOM.

CH₂=CHCH₂OCOCH(CH₂COOR)COOM.

CH₂=CHCH₂OCH₂CH(OH)CH₂COOM.

CH₂=C(CH₃)COOC₂H₄COOM.

CH₂=CHCOOC₄H₃COOM.

CH₂=CHCONHC(CH₃)₂CH₂COOM.

The examples of the copolymeric monomers containing phosphates are:

CH₂=CHCH₂OCH₂CH(OH)CH₂—O—PO₃MY¹.

CH₂=CHCONHC(CH₃)₂CH₂—O—PO₃MY².

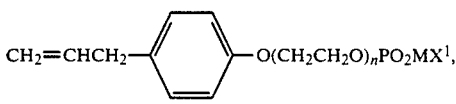

CH₂=CHCH₂O(CH₂CH₂O)mPO₂MX².

wherein M represents an alkali metal; R represents an alkyl group with 1 to 20 carbon atoms; Y¹ represents H, M or

CH₂=CHCH₂OCH₂CH(OH)CH₂—.

Y² represents H, M or

CH₂=CHCONHC(CH₃)₂CH₂—.

X¹ represents

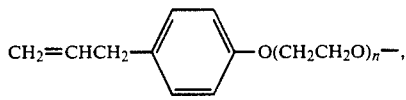

OH or OM; X² represents

CH₂=CHCH₂O(CH₂CH₂O)m—.

OH or OM. n and m represent each an integer of 1 to 100.

The preceding copolymeric monomers include the known monomers such as vinyl esters, vinylidene chloride, acrylonitrile, methacrylonitrile, styrene, acrylic acid, methacrylic acid, acrylic esters, methacrylic esters, ethylene, propylene, isobutene, butadiene, isoprene, vinyl ether, allyl ether, allyl ester, acrylamide, methacrylamide, maleic acid, and maleic ester.

The binders of this invention are formed by emulsion polymerization, solution polymerization, suspension polymerization, bulk polymerization, and the like. In any polymerization method, the known techniques such as use of molecular weight modifier and polymerization initiator, stepwise or continuous addition of monomers, and the like, can be applied.

An amount of the preceding monomers containing acid salts is preferably 0.01 to 30 mol% in a binder. An excessive amount of these monomers results in poor solubility in a solvent and tends to cause gelation, whereas an insufficient amount provides the copolymer with less prescribed property.

It is preferable that the preceding vinyl chloride copolymer further contains an epoxy group or a hydroxyl group. A vinyl chloride copolymer in the past (for example, VAGH of U.C.C. Corp.) was comprised of the following copolymeric components:

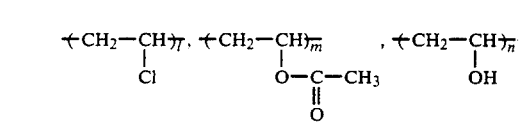

(shown as a copolymer unit).

In this copolymer unit, the group CH₃CO—O— is considered to scarcely contribute to a cross-linking reaction with a curing agent. It is, therefore, preferable to introduce in place of this group an epoxy group such as

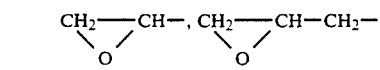

For example, a copolymer consisting of the following units is preferable:

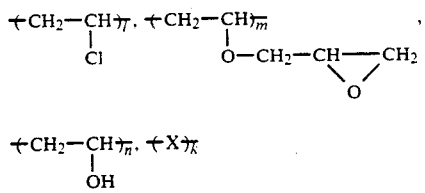

wherein X is a monomer component containing an alkali metal salt of a sulfo group or a phospho group.

Particularly useful is a urethane resin, which is preferably used in combination with a vinyl chloride copolymer, an epoxy resin (especially a phenoxy resin), a polyester resin, or a nitrocellulose resin. The resin to be combined with the urethane resin is preferably used in an amount of 10 to 90 parts by weight, preferably 20 to 80 parts per 100 parts by weight of the urethane resin. The proportion exceeding 90 parts makes coating much more fragile, which results in decreasing its durability and adhesiveness to a support to a large extent. On the other hand, the proportion less than 10 parts by weight is liable to causing drop-off of a magnetic powder.

Furthermore, an addition of a polyisocyanate curing agent to a magnetic composition containing a binder improves durability of a coating. Such a polyisocyanate curing agent is, for example, bifunctional isocyanates such as tolylenediisocyanate, diphenylmethanediisocyanate, and hexanediisocyanate, trifunctional isocyanate such as Coronate L (product of Japan Polyurethane Co.) and Desmodur L (product of Bayer AG), a curing agent in conventional use such as a urethane prepolymer having isocyanate groups at both terminals, or any polyisocyanate applicable as a curing agent. Such a polyisocyanate curing agent is used in an amount of 5 to 80 parts by weight per 100 parts by weight of a binder.

A magnetic recording medium of the invention can be formed by providing a magnetic layer 2 on a nonmagnetic support 1, which is polyethylene terephthalate etc. If necessary, a back coating (BC) layer 3 may be provided on the other side of the support 1, as shown in FIG. 1. An overcoat layer (OC) 4 may be provided on the magnetic layer (2), as shown in FIG. 2.

Figure 2:
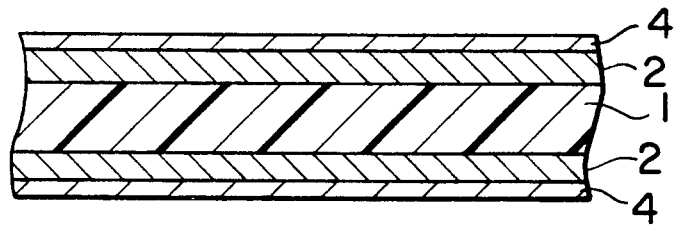

A magnetic recording medium shown in FIGS. 1 and 2 may or may not comprise a subbing layer (not shown in the drawing) between the support 1 and the magnetic layer 2. The support may be subject to a corona discharge treatment.

Besides a magnetic powder and a binder, a fatty acid and a fatty acid ester as a lubricant are preferably incorporated into a magnetic layer 2. This arrangement enables both of the fatty acid and its ester to demonstrate their characteristics and compensate the defects coming out in a single use to improve a lubrication effect, which contributes to improving a still picture durability, a travelling stability, a S/N ratio, and the like. The fatty acid is preferably used in a quantity of 0.2 to 10 parts by weight per 100 parts by weight of the magnetic powder, more preferably 0.5 to 8.0 parts by weight. The fatty acid less than this range lowers dispersibility of the magnetic powder and is liable to deteriorate a travelling property of the magnetic recording medium, whereas use to excess tends to cause the fatty acid to ooze out and an output to lower. The fatty acid ester is preferably used in a quantity of 0.1 to 10 parts by weight per 100 parts by weight of the magnetic powder, more preferably 0.2 to 8.5 parts by weight. The ester less than this range tends to cut its effect for a travelling property, whereas use to excess is liable to cause the ester to ooze out and an output to lower.

In order to optimize the preceding effects, a weight ratio of fatty acid to fatty acid ester is preferably 10 to 90 through 90 to 10. A fatty acid has also an effect to promote dispersion. For this reason, it is expected that the fatty acid can reduce an addition of other low molecular weight dispersant, which provides possibility to improve a modulus of a magnetic recording medium.

The fatty acid may be monobasic or dibasic. The fatty acid comprises preferably 6 to 30 carbon atoms, more preferably 12 to 22 carbon atoms. The examples of the fatty acid are:
(1) Caproic acid
(2) Caprylic acid
(3) Capric acid
(4) Lauric acid
(5) Myristic acid
(6) Palmitic acid
(7) Stearic acid
(8) Isostearic acid
(9) Linolenic acid
(10) Linolic acid
(11) Oleic acid
(12) Elaidic acid
(13) Behenic acid
(14) Malonic acid
(15) Succinic acid
(16) Maleic acid
(17) Glutaric acid
(18) Adipic acid
(19) Pimelic acid
(20) Azelaic acid
(21) Sebacic acid
(22) 1,12-dodecanedicarboxylic acid
(23) Octanedicarboxylic acid The examples of the fatty acid ester are:
(1) Oleyl oleate
(2) Isocetyl stearate
(3) Dioleyl maleate
(4) Butyl stearate
(5) Butyl palmitate
(6) Butyl myristate
(7) Octyl myristate
(8) Octyl palmitate
(9) Amyl stearate
(10) Amyl palmitate
(11) Isobutyl oleate
(12) Stearyl stearate
(13) Lauryl oleate
(14) Octyl oleate
(15) Iosbutyl oleate
(16) Ethyl oleate
(17) Isotridecyl oleate
(18) 2-ethylhexyl stearate
(19) Ethyl stearate
(20) 2-ethylhexyl palmitate
(21) Isopropyl palmitate
(22) Isopropyl myristate
(23) Butyl laurate
(24) Cetyl-2-ethyl hexalate
(25) Dioleyl adipate
(26) Diethyl adipate
(27) Diisobutyl adipate
(28) Diisodecyl adipate There may be incorporated into the magnetic layer a lubricant other than the above-mentioned fatty acids and esters thereof (for example, silicone oil, carboxylic acid-modified and ester-modified products), graphite, carbon fluoride, molybdenum disulfide, tungsten disulfide, fatty acid amide, and α-olefin oxide. Further, there may be incorporated a non-magnetic abrasive powder such as alumina, chromium oxide, titanium oxide, α-iron oxide, silicon dioxide, silicon nitride, silicon carbide, zirconium oxide, zinc oxide, cerium dioxide, magnesium oxide, and boron nitride. The abrasive is preferably added in an amount of less than 20 parts by weight per 100 parts by weight of the magnetic powder, more preferably 3 to 12 parts by weight, and an average particle diameter is preferably 0.6 μm, more preferably less 0.3 μm.

The magnetic layer may further contain an antistatic agent such as graphite and a dispersant such as powder licithin and phosphoric ester, in combination with carbon black.

The examples of the light-shielding carbon black, which can improve a light-shielding effect, are Raven 2000 (specific surface area 190 m$^2$/g, particle diameter 18 mμ), Raven 2100, Raven 1170 and Raven 1000, all made by Columbian Carbon Corp., and #100, #75, #40, #35 and #30, all made by Mitsubishi Chemical Industries, Ltd.

The examples of a conductive carbon black used in the invention are Conductex 975 (BET value (hereinafter referred to as "BET") 250 m$^2$/g, DBP oil absorption (hereinafter referred to as "DBP") 170 ml/100 gr, particle diameter 24 mμ), Conductex 900 (BET 125 m$^2$/g, particle diameter 27 mμ), Conductex 40- 220 (particle diameter 20 mμ), Conductex SC (BET 220 m$^2$/gr, DBP 115 ml/100 gr, particle diameter 20 mμ), all made by Columbian Carbon Corp., Vulcan XC-72 (specific surface 254 m$^2$/g, particle diameter 30 mμ) and Vulcan P (BET 143 m$^2$/gr, DBP 118 ml/100 gr, particle diameter 20 mμ), both made by Cabot Corp., Raven 1040 and Raven 420, Black Pearls 2000 (particle diameter 15 mμ), and #44 of Mitsubishi Chemical Industries, Ltd.

The other carbon black products applicable likewise to this invention are Conductex-SC (BET 220 m$^2$/gr, DBP 115 ml/100 g, particle diameter 20 mμ), of Columbia Carbon Corp., Vulcan 9 (BET 140 m$^2$/g, DBP 114 ml/100 g, particle diameter 19 mμ), of Cabot Corp. #80 (BET 117 m$^2$/g, DBP 113 ml/100 g, particle diameter 23 mμ), of Asahi Carbon Ltd , HS100 (BET 32 m$^2$/g, DBP 180 ml/100 g, particle diameter 53 mμ) of Denki kagaku Co., and #22B (BET 55 m$^2$/g, DBP 131 ml/100 g, particle diameter 40 mμ), #20B (BET 56 m$^2$/g, DBP 115 ml/100 g, particle diameter 40 mμ), and 3500 (BET 47 m$^2$g, DBP 187 ml/100 g, particle diameter 40 mμ), all made by Mitsubishi Chemical Industries, Ltd. The carbon black products applicable further to this invention are CF-9, #4000, and MA-600, all made by Mitsubishi Chemical Industries, Ltd., Black Pearls L, Monarck 800, Black Pearls 700, Black Pearls 1000, Black Pearls 880, Black Peals 900, Black Pearls 1300, Black Pearls 2000, and Sterling V, all made by Cabot Corp., and Raven 410, Raven 3200, Raven 430, Raven 450, Raven 825, Raven 1255, Raven 1035, Raven 1000, Raven 5000, and Ketchen Black FC, all made by Columbian Carbon Corp.

An average particle size of a non-magnetic filler used in a back coating layer is preferably 10 mμ to 1,000 mμ. The filler particles in this size range, which is not excessively fine, will maximize an effect.

The examples of the non-magnetic fillers useful in the invention are silicon dioxide, titanium oxide, aluminum oxide, chromium oxide, silicon carbide, calcium carbide, zinc oxide, α-Fe$_2$O$_3$, talc, kaolin, calcium sulfate, boron nitride, zinc fluoride, molybdenum dioxide, calcium carbide, and barium sulfate. Some organic powder materials are also useful for the same purpose, for example benzoguanamine resins, melamine resins, and phthalocyanine pigments. It is also possible to use an inorganic powder in combination with an organic powder.

It is especially preferable to use carbon black in combination with a non-magnetic powder. Such combination renders a travelling property of a magnetic recording medium more stable, and a synergism with the non-magnetic particles makes it possible to improve further a durability of the magnetic recording medium.

EXAMPLE

The present invention will now be described with reference to the examples. In this connection, it is to be understood that various changes and modifications may be made in respect of the ingredients, the proportions in which they are used, the procedures in which the embodiments are formed, and the like without deviating from the spirit and scope of the invention.

A magnetic layer was formed on a support consisting of a polyethylene terephthalate film with a thickness of 10 μm in the following manner (hereinafter, parts represent parts by weight, unless a specific remark is issued).

A magnetic coating material was prepared from a prescribed magnetic powder and ingredients shown in Table 1, by dispersing and filtering the ingredients through a 1 μm filter; after adding 5 parts of multifunctional isocyanate the magnetic coating material was coated in thickness of 2.5 μm on the support and finished by supercalendering to form a magnetic layer having the composition shown in Table 1.

Subsequently, a coating material for a back coating layer, which had the undermentioned composition, was coated on the other side of the magnetic layer to form a layer with a dry thickness of 0.4 μm.

| | |
|---|---|
| Carbon black (mean particle diameter 50 μm) | 40 parts |
| Barium sulfate | 10 parts |
| Nitrocellulose | 25 parts |
| N-2301 (product of Japan Polyurethane Co.) | 25 parts |
| Coronate L (product of Japan Polyurethane Co.) | 10 parts |
| Cyclohexanone | 400 parts |
| Methyl ethyl ketone | 250 parts |
| Toluene | 250 parts |

As follows are the compositions of vinyl chloride copolymer and polyurethane used for Examples and Comparisons;

EXAMPLE 1

| Vinyl chloride copolymer containing a sulfonic acid salt | |
|---|---|
| average degree of polymerization | 314 |

      94.8 wt %

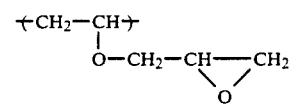      4.0 wt %

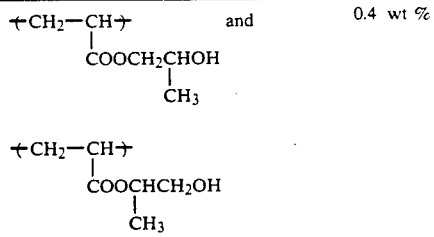

and 0.4 wt %

The results of the measurements in Table 1 show that the magnetic recording material prepared in accordance with the present invention is improved in electromagnetic conversion characteristics as well as travelling durability and conductivity, and dropout is reduced to a large extent.

TABLE 1

| | | | Example 1 | Example 2 | Example 3 | Comparison 1 | Comparison 2 | Comparison 3 |
|---|---|---|---|---|---|---|---|---|
| Composition | Ingredients of magnetic coating | Ferromagnetic powder* | $Fe_5C_2$ 100 parts | $Fe_5C_2$ 100 parts | $Fe_5C_2$ 100 parts | $Co-\gamma-Fe_2O_3$ 100 parts | $Co-\gamma-Fe_2O_3$ 100 parts | $Fe_5C_2$ 100 parts |
| | | Vinyl chloride copolymer | With sulfonic group 11 parts | | With phospho group 11 parts | With sulfonic group 11 parts | Without sulfonic group 11 parts | Without sulfonic group 11 parts |
| | | Polyurethane | With sulfonic group 11 parts | | With phospho group 11 parts | With sulfonic group 11 parts | Without sulfonic group 11 parts | Without sulfonic group 11 parts |
| | | Almina | 5 parts | Same | | | | |
| | | Carbon black | 1 part | | | | | |
| | | Lauric acid | 1.5 parts | | | Same | Same | Same | Same |
| | | Butyl stearate | 1 parts | | Same | | | |
| | | Cyclohexanone | 100 parts | | | | | |
| | | Methyl ethyl ketone | 70 parts | | | | | |
| | | Toluene | 80 parts | | | | | |
| Properties | | Video S/N (dB) | +3.5 | +4.0 | +3.5 | +3.0 | +1.5 | +1.2 |
| | | Rectangular ratio | 0.82 | 0.81 | 0.82 | 0.82 | 0.75 | 0.73 |
| | | Travelling durability | Good | Good | Good | Good | Poor | Poor |
| | | Dropout | Good | Good | Good | Poor | Poor | Poor |
| | | Surface resistance of magnetic layer ($\Omega/cm^2$) | $1 \times 10^8$ | $1 \times 10^8$ | $1 \times 10^8$ | $1 \times 10^{11}$ | $1 \times 10^{11}$ | $5 \times 10^8$ |
| | | Light transmittance (%) | 0.02 | 0.02 | 0.02 | 0.3 | 0.3 | 0.02 |

*Ferromagnetic powder -
Example 1: Hc 700 Oe, σs 98 emu/g, BET value 40 m²/g
Example 2: Hc 920 Oe, σs 100 emu/g, BET value 42 m²/g
Example 3: Same as Example 1
Comparison 1: Hc 660 Oe, σs 77 emu/g, BET value 40 m²/g
Comparison 2: Same as Comparison 1
Comparison 3: Same as Example 1

| | |
|---|---|
| ⁺X⁺ (containing —SO₃Na) | 0.8 wt % |
| Polyurethane containing a sulfonic acid salt | |
| Methylenediisocyanate | 12.7 wt % |
| Neopentyl glycol | 16.2 wt % |
| 1,6-Hexanediol | 31.4 wt % |
| Adipic acid | 38.7 wt % |
| (containing —SO₃Na) | 1.0 wt % |

Example 2: same as Example 1.
Example 3: same as Example 1, besides that X contains —PO₂ (OH)Na instead of —SO₂Na. Comparison 1: same as Example 1. Comparison 2: same as Example 1, besides that X in a vinyl chloride copolymer is vinyl chloride and X in polyurethane is adipic acid. Comparison 3: same as Comparison 2.

A magnetic film having a magnetic layer and BC layer each with a prescribed thickness was produced in a wide strip and rolled up on a reel. The film was cut into a strip of 8 mm width to make the video tapes corresponding to the numbers of Example and Comparison in Table 1. Respective video tapes were subjected to the following measurements, of which results are shown in Table 1.

| | |
|---|---|
| Video S/N: | Measured on a VHS deck (R-5 was set at OdB) |
| Light transmittance: | Used light of a wavelength of 900 nm |
| Travelling durability: | Evaluated by a fold and deterioration of a reproduction output after carrying out 100 passes. |
| Dropout: | Number of dropout in a reproduced image |

What is claimed is:
1. A magnetic recording medium comprising a support having provided thereon, a magnetic layer containing a magnetic powder containing iron carbide, and a binder comprising a polyurethane resin and at least one other resin, each resin having a hydrophilic polar group selected from a sulfo group, a phospho group, a carboxyl group, and derivatives thereof, including salts thereof.

2. The recording medium of claim 1 wherein said iron carbide has a BET specific surface area of 40 m²/g or more.

3. The recording medium of claim 1 wherein said other resin comprises a vinyl chloride copolymer.

4. The recording medium of claim 1 wherein said other resin is formed by copolymerization of a first monomer and a copolymeric monomer comprising said hydrophilic polar group.

5. The recording medium of claim 4 wherein said first monomer is vinyl chloride.

6. The recording medium of claim 5 wherein said copolymer resin formed by copolymerization of said vinyl chloride and said copolymeric monomer comprises an epoxy group and a hydroxy group.

7. The recording medium of claim 6, wherein said copolymer resin comprises of units of:

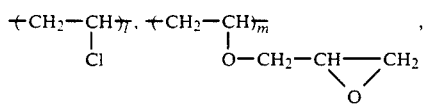

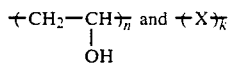

wherein X represents the copolymeric monomer comprising the sulfo group or the phospho group of the alkaline metal salts.

8. The recording medium of claim 4 wherein a ratio of said polyurethane to said other resin is 20/80 to 80/20, by weight.

9. The recording medium of claim 8, wherein a ratio of said iron carbide to said other magnetic powders is 95/5 to 55/45 by weight.

10. The recording medium of claim 4, wherein a ratio of the monomer having the polar group to total monomers inclusive of polyurethane is 0.01 to 30 mol %.

11. The recording medium of claim 1, wherein said hydrophilic polar group is —$SO_3M$, —COOM or —$PO(OM')_2$, wherein M and M' represent independently a hydrogen atom, an alkaline metal, and a substituted or unsubstituted hydrocarbon residue.

12. The recording medium of claim 11, wherein a monomer from which said resin comprising —$SO_3M$ is formed is:

$CH_2$=$CHSO_3M$, $CH_2$=$CHCH_2SO_3M$, $CH_2$=$C(CH_3)CH_2SO_3M$, $CH_2$=$CHCH_2OCOCH(CH_2COOR)SO_3M$, $CH_2$=$CHCH_2OCH_2CH(OH)CH_2SO_3M$, $CH_2$=$C(CH_3)COOC_2H_4SO_3M$, $CH_2$=$CHCOOC_4H_8SO_3M$, or $CH_2$=$CHCONHC(CH_3)_2CH_2SO_3M$, wherein M represents an alkaline metal.

13. The recording medium of claim 11, wherein the monomer comprising —COOM is:

$CH_2$=$CHCOOM$, $CH_2$=$CHCH_2COOM$, $CH_2$=$C(CH_3)CH_2COOM$, $CH_2$=$CHCH_2OCOCH(CH_2COOR)COOM$, $CH_2$=$CHCH_2OCH_2CH(OH)CH_2COOM$, $CH_2$=$C(CH_3)COOC_2H_4COOM$, $CH_2$=$CHCOOC_4H_8COOM$, or $CH_2$=$CHCONHC(CH_3)_2CH_2COOM$, wherein M represents an alkaline metal and R represents an alkyl group having 1 to 20 carbon atoms.

14. The recording medium of claim 11, wherein the monomer comprising —$PO(OM')_2$ is:

$CH_2$=$CHCH_2OCH_2CH(OH)CH_2$—$OPO_3MY^1$, $CH_2$=$CHCONHC(CH_3)_2CH_2$—$OPO_3MY^2$,

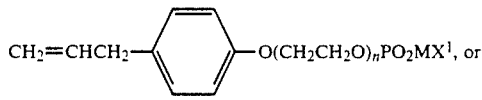

$CH_2$=$CHCH_2O(CH_2CH_2O)_mPO_2MX^2$, wherein $Y^1$ represents a hydrogen atom, M or $CH_2$=$CHCH_2OCH_2CH(OH)CH_2$—; $Y^2$ represents a hydrogen atom, M, or $CH_2$=$CHCONHC(CH_3)_2CH_2$—; $X^1$ represents

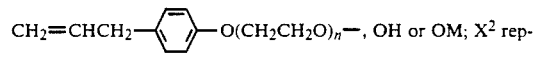

resents $CH_2$=$CHCH_2O(CH_2CH_2O)_m$—, OH or OM; M represents an alkaline metal; n and m represent independently an integer of 1 to 100.

* * * * *